(No Model.)
I. H. VAN HORN & W. NEEL.
POTATO DIGGER.
No. 497,148. Patented May 9, 1893.
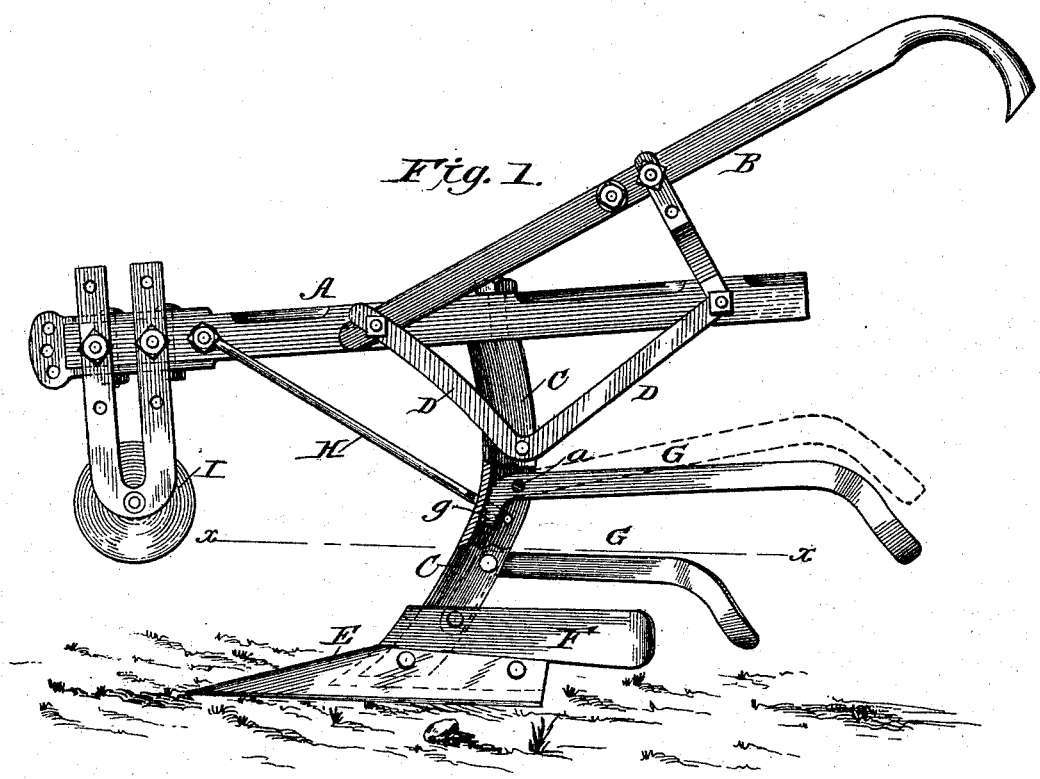
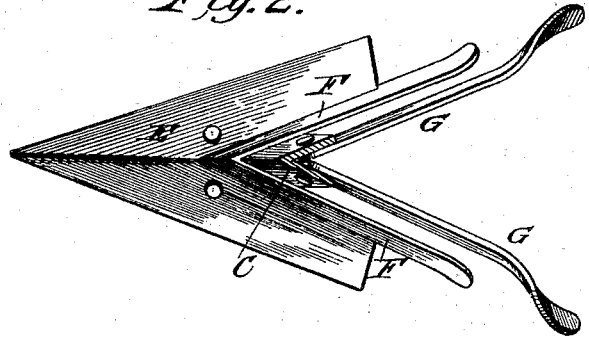
WITNESSES:
Fred G. Dieterich
Edw. —
INVENTORS:
Isaiah H. Van Horn
William Neel
BY
Munn & Co.
ATTORNEYS

UNITED STATES PATENT OFFICE.

ISAIAH H. VAN HORN AND WILLIAM NEEL, OF THORNVILLE, OHIO.

POTATO-DIGGER.

SPECIFICATION forming part of Letters Patent No. 497,148, dated May 9, 1893.

Application filed October 14, 1892. Serial No. 448,915. (No model.)

*To all whom it may concern:*

Be it known that we, ISAIAH H. VAN HORN and WILLIAM NEEL, of Thornville, in the county of Perry and State of Ohio, have invented a new and useful Improvement in a Combined Cultivator and Potato-Digger, of which the following is a specification.

Our invention is in the nature of an improved combined cultivator and potato digger which may be used for ditching or cleaning ditches; furrowing out; splitting middles; hilling up; making ridges for sweet potatoes; digging potatoes, and various other uses throughout the season, and which is of simple, cheap and durable construction, and may be made by any blacksmith.

It consists in the peculiar construction and arrangement of the parts as hereinafter shown and described.

Figure 1 is a side view partly in section, and Fig. 2, is a horizontal section through line *x—x*.

In the drawings A represents the draft beam which has a clevis at the front end, and a gage wheel I to determine the depth the plow is to run in the ground.

B, B, are the handles fastened at their front ends to the beam, and also connected about their middle parts to the beam by braces.

C is the plow standard, connected to the beam at its upper end and having at its lower end the A shaped shovel E. This shovel is bolted to the lower part of the standard and is made detachable, and is to be made in three or more sizes according to the use to which the plow is put.

F, F, are wings which are bolted along the upper rear edges of the shovel both to the shovel and to the standard.

G, G, are wings which are arranged at a higher level and are bolted to the standard and project rearwardly. The standard C is made V-shaped in cross section, see Fig. 2, with its sharp edge to the front. This adapts the standard to cut through the soil, and also makes a strong and stiff standard, and also gives space upon the inside for bolting the wings G. The upper one of the wings is hung loosely to the standard about a bolt *a*, so that it is free to rise and fall, and its downward movement is limited by an elbow or downwardly bent end *g*, which strikes against the standard.

D, D, is a double brace for holding the standard stiffly to the beam, and H is an extra brace in front running from the standard to the beam. This latter is used for ditching and cleaning ditches.

When using the implement for cultivating or hilling purposes, we employ the shovel E, wing F, and the lower rigid wing G. For digging potatoes we use, in addition to these, the loosely hung upper wings G. Both the narrow wings G G are at their rear ends bent downward, as shown in Fig. 1, and the rear ends of wings G and F are also bent forwardly and outwardly as seen in Fig. 2. This construction of the downward bent ends allows the ground to sift through between the wings F, and G, and the potatoes to pass over the lower wing G, while the upper wing G, which is loosely hung, rises just enough to throw off the weeds and vines, leaving the ground level, and the potatoes scattered in the rear of the digger in a better manner than can be done with mold boards, which throw both the ground and the potatoes out to one side, covering many of them up.

We are aware that potato diggers have heretofore been made with double mold boards having straight rearwardly projecting wings or fingers, and we make no broad claim to this construction.

Having thus described our invention, what we claim as new, and desire to secure by Letters Patent, is—

1. The combination with the standard in a potato digger; of a pair of horizontally projecting and loosely hung wings having downwardly and outwardly bent rear ends, and stop devices for holding the wings horizontal substantially as shown and described.

2. The combination of the V shaped standard C, and the loosely hung wing G having elbow *g* substantially as shown and described.

ISAIAH H. VAN HORN.
WILLIAM NEEL.

Witnesses:
J. H. BECK,
J. F. LAWYER.